US011889610B2

(12) United States Patent
Wang et al.

(10) Patent No.: US 11,889,610 B2
(45) Date of Patent: Jan. 30, 2024

(54) ELECTROMAGNETIC WAVE GENERATING SYSTEM AND HEATING DEVICE WITH ELECTROMAGNETIC WAVE GENERATING SYSTEM

(71) Applicant: HAIER SMART HOME CO., LTD., Shandong (CN)

(72) Inventors: Haijuan Wang, Qingdao (CN); Lixiao Zhang, Qingdao (CN); Peng Li, Qingdao (CN); Xiaobing Zhu, Qingdao (CN)

(73) Assignee: HAIER SMART HOME CO., LTD., Shandong (CN)

( * ) Notice: Subject to any disclaimer, the term of this patent is extended or adjusted under 35 U.S.C. 154(b) by 370 days.

(21) Appl. No.: 17/420,613

(22) PCT Filed: Dec. 11, 2019

(86) PCT No.: PCT/CN2019/124658
§ 371 (c)(1),
(2) Date: Jul. 2, 2021

(87) PCT Pub. No.: WO2020/140713
PCT Pub. Date: Jul. 9, 2020

(65) Prior Publication Data

US 2022/0086972 A1 Mar. 17, 2022

(30) Foreign Application Priority Data

Jan. 4, 2019 (CN) ......................... 201910009058.5

(51) Int. Cl.
*H01Q 1/36* (2006.01)
*H05B 6/72* (2006.01)
(Continued)

(52) U.S. Cl.
CPC ................. *H05B 6/72* (2013.01); *H05B 6/50* (2013.01); *H05B 6/62* (2013.01); *H05B 6/688* (2013.01)

(58) Field of Classification Search
CPC ... H05B 6/72; H05B 6/50; H05B 6/62; H05B 6/688
See application file for complete search history.

(56) References Cited

U.S. PATENT DOCUMENTS

2018/0042074 A1 2/2018 Qiu et al.
2022/0086968 A1 * 3/2022 Zhang .................... H05B 6/688

FOREIGN PATENT DOCUMENTS

CN 101627536 A 1/2010
CN 102122932 A 7/2011
(Continued)

OTHER PUBLICATIONS

International Search Report for PCT/CN2019/124658 (ISA/CN) dated Feb. 25, 2020 (7 pages).
(Continued)

*Primary Examiner* — Joseph J Lauture
(74) *Attorney, Agent, or Firm* — ALSTON & BIRD LLP

(57) ABSTRACT

The present invention discloses an electromagnetic wave generating system, including an electromagnetic generating module, a radiating assembly and a matching unit connected in series between the electromagnetic generating module and the radiating assembly. The electromagnetic generating module is configured to generate an electromagnetic wave signal. The radiating assembly includes one or more radiating units and is configured to be electrically connected with the electromagnetic generating module to generate electromagnetic waves of a corresponding frequency according to the electromagnetic wave signal. The matching unit includes a first matching module, a second matching module and a fixed value inductor. The input end of the first
(Continued)

matching module is configured to be electrically connected with the electromagnetic generating module. The fixed value inductor is connected in series between the output end of the first matching module and the radiating assembly. The input end of the second matching module is connected in series between the output end of the first matching module and the inductor, and the output end of the second matching module is configured to be grounded. The first matching module and the second matching module respectively include a plurality of parallel branches to realize a load combination that is several times the sum of the number of the parallel branches of the two matching modules.

10 Claims, 6 Drawing Sheets

(51) Int. Cl.

| | |
|---|---|
| ***H05B 6/50*** | (2006.01) |
| ***H05B 6/62*** | (2006.01) |
| *H05B 6/68* | (2006.01) |

(56) References Cited

FOREIGN PATENT DOCUMENTS

| | | | |
|---|---|---|---|
| CN | 102891660 | A | 1/2013 |
| CN | 206213147 | U | 6/2017 |
| CN | 107710869 | A | 2/2018 |
| CN | 108233886 | A | 6/2018 |
| CN | 108668395 | A | 10/2018 |
| CN | 108924982 | A | 11/2018 |
| CN | 210042291 | U | 2/2020 |
| EP | 3136001 | A1 | 3/2017 |
| JP | 51-159746 | U | 12/1976 |
| JP | H 05-283158 | | 10/1993 |
| JP | 2018-022675 | A | 2/2018 |
| JP | 2018-521494 | A | 8/2018 |
| RU | 2308823 | C2 | 10/2007 |
| WO | WO 2017/006673 | A1 | 1/2017 |

OTHER PUBLICATIONS

Notice of Acceptance for Australia Patent Application No. 2019418574 dated Sep. 1, 2022 (3 pages).
Decision to Grant for EP Patent Application No. 19906867.7 dated Jan. 19, 2023 (2 pages).
Intention to Grant for EP Patent Application No. 19906867.7 dated Sep. 19, 2022 (28 pages).
Decision of Refusal for Japan Patent Application No. 2021-538828 (3 pages).
Decision to Grant for Russia Patent Application No. 2021122549 dated Nov. 30, 2021 (13 pages).
Search Report for Russia Patent Application No. 2021122549 dated Nov. 30, 2021 (4 pages).
Supplementary European Search Report for EP Application No. 19906867.7 dated Feb. 8, 2022 (4 pages).
1st Office Action for EP Application No. 19906867.7 dated Feb. 18, 2022 (5 pages).
1st Office Action for Australia Patent Application No. 2019418574 dated May 5, 2022 (3 pages).
1st Office Action for India Patent Application No. 202137029616 dated Feb. 24, 2022 w/English translation (6 pages).
1st Office Action for Japan Patent Application No. 2021-538828 (4 pages).

* cited by examiner

ELECTROMAGNETIC WAVE GENERATING SYSTEM AND HEATING DEVICE WITH ELECTROMAGNETIC WAVE GENERATING SYSTEM

CROSS-REFERENCE TO RELATED APPLICATIONS

The present application is a national phase entry of International Application No. PCT/CN2019/124658, filed Dec. 11, 2019, which claims priority to Chinese Patent Application No. 201910009058.5, filed Jan. 4, 2019, which are incorporated herein by reference in their entirety.

TECHNICAL FIELD

The present invention relates to kitchen appliances, and particularly relates to an electromagnetic wave generating system and a heating device with the electromagnetic wave generating system.

BACKGROUND ART

In the freezing process of food, the quality of the food is maintained, but the frozen food needs to be thawed before processing or eating. In order to facilitate users freezing and thawing the food, in the prior art, the food is generally thawed by adding an electromagnetic wave device to a refrigerating and freezing device.

However, not only the dielectric coefficients of foods with different attributes are different, but the dielectric coefficients of foods with the same attributes will also change as the temperature changes during the thawing process, so that the absorption rate of electromagnetic waves by the foods fluctuates up and down. By comprehensive consideration, a high-efficiency electromagnetic wave generating system applicable to different loads and a heating device with the electromagnetic wave generating system are required in design.

SUMMARY OF THE INVENTION

An objective of the first aspect of the present invention is to provide a high-efficiency electromagnetic wave generating system applicable to different loads.

An objective of the second aspect of the present invention is to provide a heating device with the electromagnetic wave generating system.

According to the first aspect of the present invention, provided is an electromagnetic wave generating system, including:

an electromagnetic generating module, configured to generate an electromagnetic wave signal;

a radiating assembly, including one or more radiating units and configured to be electrically connected with the electromagnetic generating module to generate electromagnetic waves of a corresponding frequency according to the electromagnetic wave signal; and a matching unit, connected in series between the electromagnetic generating module and the radiating assembly, and configured to adjust a load impedance of the electromagnetic generating module, wherein the matching unit includes:

a first matching module, an input end of which is configured to be electrically connected with the electromagnetic generating module;

a fixed value inductor, connected in series between an output end of the first matching module and the radiating assembly; and a second matching module, an input end of which is connected in series between the output end of the first matching module and the inductor, and an output end of which is configured to be grounded, wherein the first matching module and the second matching module respectively include a plurality of parallel branches.

Optionally, each parallel branch of the first matching module includes a fixed value capacitor and a switch connected in series.

Optionally, a plurality of switches of the first matching module are integrated into an array type switch assembly.

Optionally, each parallel branch of the second matching module includes a fixed value capacitor and a switch connected in series.

Optionally, a plurality of switches of the second matching module are integrated into an array type switch assembly.

Optionally, the electromagnetic wave generating system further includes:

a detection unit, connected in series between the matching unit and the electromagnetic generating module, and configured to detect specific parameters of an incident wave signal and a reflected wave signal passing through the detection unit; and a control unit, configured to calculate an electromagnetic wave absorption rate according to the specific parameters, and send an adjusting command to the matching unit according to the electromagnetic wave absorption rate.

According to the second aspect of the present invention, provided is a heating device, including:

a cylinder body, provided with a pick-and-place opening;

a door body, disposed at the pick-and-place opening and configured to open and close the pick-and-place opening; and any one of the above electromagnetic wave generating systems, at least a part of which is disposed in the cylinder body or accessed into the cylinder body, so as to generate electromagnetic waves in the cylinder body to heat an object to be processed.

Optionally, the matching unit is disposed in the cylinder body; and the heating device further includes:

a housing, configured to separate an inner space of the cylinder body into a heating chamber and an electrical appliance chamber, wherein the object to be processed and the matching unit are respectively disposed in the heating chamber and the electrical appliance chamber.

Optionally, the cylinder body and the housing are provided with heat dissipation holes in positions corresponding to the matching unit.

Optionally, the detection unit, the control unit and the matching unit are integrated on a circuit board; and the cylinder body is made of a metal and is configured to be grounded, and the circuit board is configured to be conductively connected with the cylinder body.

In the electromagnetic wave generating system of the present invention, since two matching modules which respectively include a plurality of parallel branches are connected in series between the electromagnetic generating module and the radiating assembly, and one end of the matching module far away from the output end of the electromagnetic generating module is grounded, a load combination that is several times the sum of the number of the parallel branches of the two matching modules can be realized. Compared with the technical solution of adjusting the spacing between a radiating unit and a receiving pole by a mechanical electric motor structure in the prior art, the present invention is not only lower in cost, but also higher in reliability and faster in response speed. Compared with the technical solution of adjusting the load impedance by variable capacitors and variable inductors in the prior art, the present invention is not only lower in cost, but also higher in reliability and wider in adjusting range.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn in scale. In figures.

DETAILED DESCRIPTION OF THE INVENTION

Figure 1:
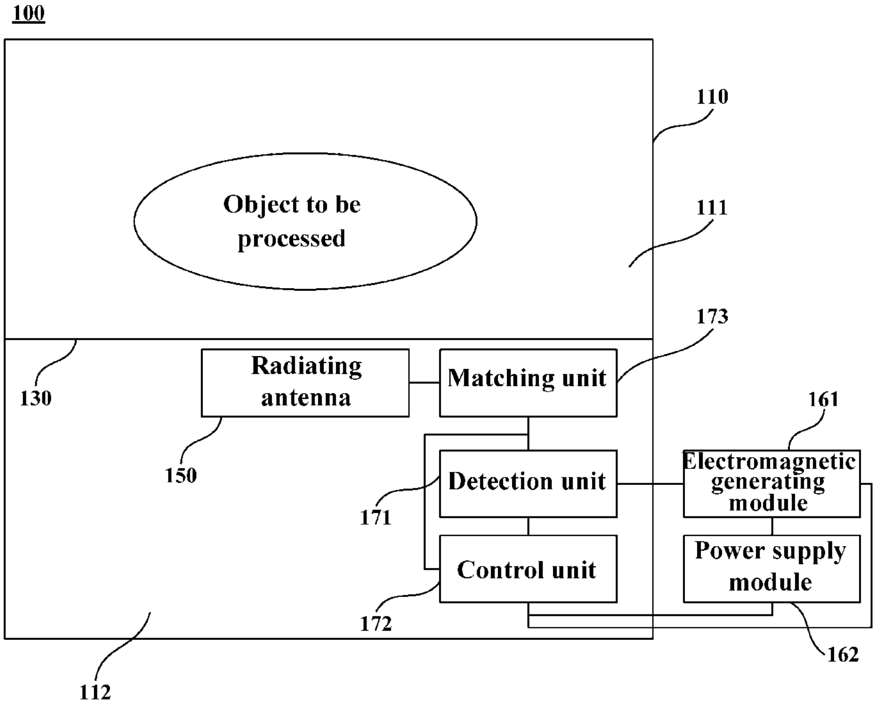
FIG. 1 is a schematic structural view of a heating device according to one embodiment of the present invention.
Figure 2:
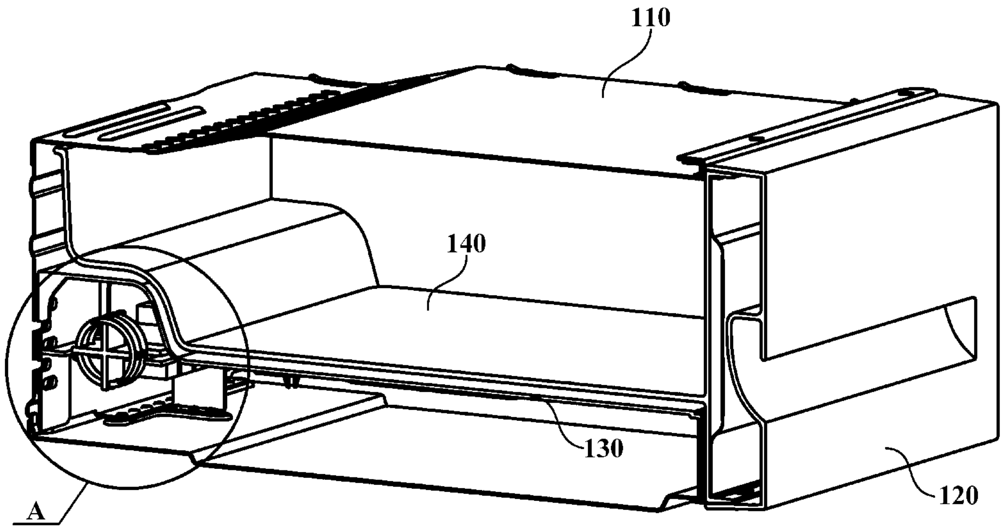
FIG. 2 is a schematic cross-sectional view of the heating device as shown in FIG. 1, wherein an electromagnetic generating module and a power supply module are omitted.

FIG. 1 is a schematic structural view of a heating device 100 according to one embodiment of the present invention. FIG. 2 is a schematic cross-sectional view of the heating device 100 as shown in FIG. 1, wherein an electromagnetic generating module 161 and a power supply module 162 are omitted. Referring to FIG. 1 and FIG. 2, the heating device 100 may include a cylinder body 110, a door body 120 and an electromagnetic wave generating system.

The cylinder body 110 may be configured to place an object to be processed, and a front wall or a top wall of the cylinder body may be provided with a pick-and-place opening for picking and placing the object to be processed.

The door body 120 may be installed together with the cylinder body 110 by an appropriate method, such as a sliding rail connection, a hinged connection, etc., and is configured to open and close the pick-and-place opening. In an illustrated embodiment, the heating device 100 also includes a drawer 140 for carrying the object to be processed; a front end plate of the drawer 140 is configured to be fixedly connected with the door body 120, and two lateral side plates of the drawer are movably connected with the cylinder body 110 by sliding rails.

In some embodiments, the electromagnetic wave generating system may include an electromagnetic generating module 161, a power supply module 162 and a radiating assembly.

The power supply module 162 may be configured to be electrically connected with the electromagnetic generating module 161 to provide electric energy to the electromagnetic generating module 161, so that the electromagnetic generating module 161 generates electromagnetic wave signals. The radiating assembly may include one or more radiating units disposed in the cylinder body 110 or accessed into the cylinder body 110, and the one or more radiating units are all electrically connected with the electromagnetic generating module 161 to generate electromagnetic waves of the corresponding frequencies according to the electromagnetic wave signals, so as to heat the object to be processed in the cylinder body 110. In some embodiments, the number of the radiating units may be one, and the radiating unit is a flat plate type radiating antenna 150.

The cylinder body 110 and the door body 120 may be respectively provided with electromagnetic shielding features, so that the door body 120 is conductively connected with the cylinder body 110 when the door body is in a closed state, so as to prevent electromagnetic leakage.

In some embodiments, the cylinder body 110 may be made of metals to serve as a receiving pole to receive electromagnetic waves generated by the radiating antenna 150. In some other embodiments, a receiving pole plate may be disposed on the top wall of the cylinder body 110 to receive the electromagnetic waves generated by the radiating antenna 150.

Figure 3:
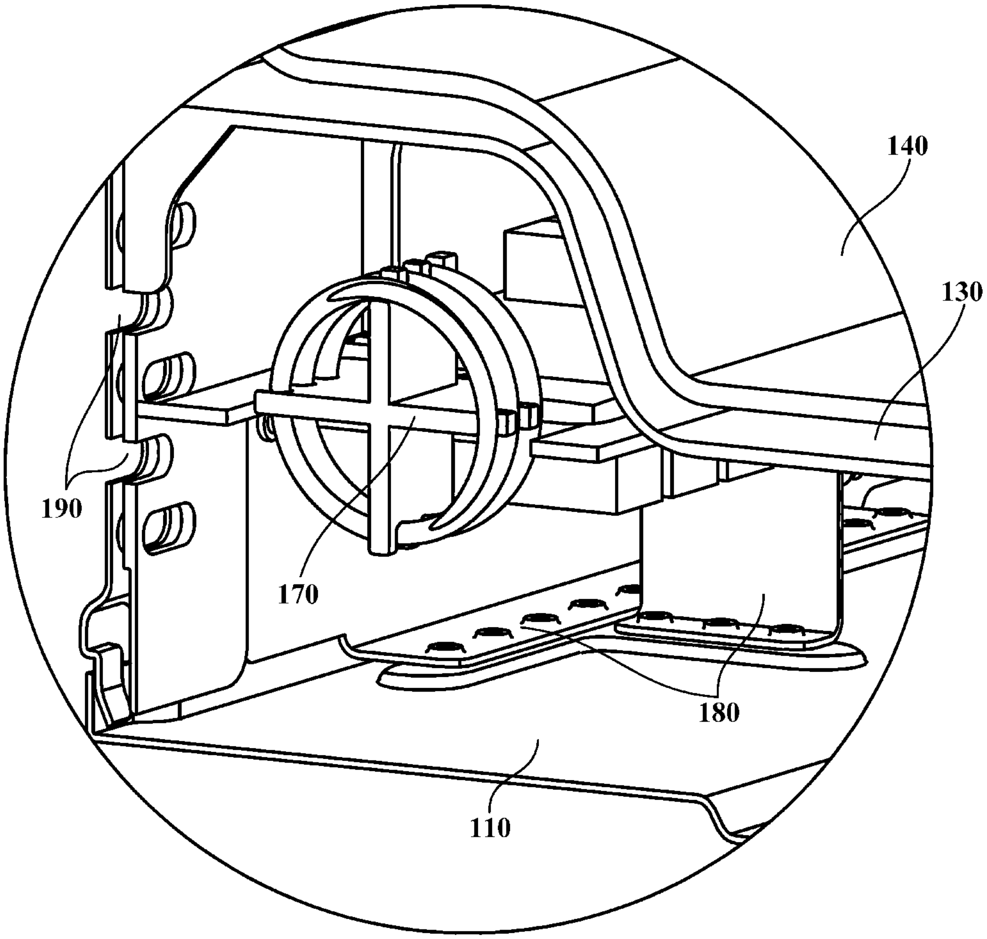
FIG. 3 is a schematic enlarged view of a region A in FIG. 2.

FIG. 3 is a schematic enlarged view of a region A in FIG. 2. Referring to FIG. 1 to FIG. 3, the heating device 100 may further include a signal processing and measurement and control circuit. Specifically, the signal processing and measurement and control circuit may include a detection unit 171, a control unit 172 and a matching unit 173.

The detection unit 171 may be connected in series between the electromagnetic generating module 161 and the radiating antenna 150, and is configured to detect in real time the specific parameters of incident wave signals and reflected wave signals passing through the detection unit.

The control unit 172 may be configured to acquire the specific parameters from the detection unit 171, and calculate the power of incident waves and reflected waves according to the specific parameters. In the present invention, the specific parameters may be voltage values and/or current values. Alternatively, the detection unit 171 may be a power meter to directly measure the power of incident waves and reflected waves.

The control unit 172 may further calculate an electromagnetic wave absorption rate of the object to be processed according to the power of incident waves and reflected waves, compare the electromagnetic wave absorption rate with a preset absorption threshold, and sends an adjusting command to the matching unit 173 when the electromagnetic wave absorption rate is less than the preset absorption threshold. The preset absorption threshold may be 60% to 80%, such as 60%, 70% or 80%.

The matching unit 173 may be connected in series between the electromagnetic generating module 161 and the radiating antenna 150, and is configured to adjust a load impedance of the electromagnetic generating module 161 according to an adjusting command of the control unit 172, so as to improve the matching degree between the output impedance and the load impedance of the electromagnetic generating module 161, so that when foods with different fixed attributes (such as type, weight and volume) are placed in the heating chamber 111, or during the temperature change of the foods, relatively more electromagnetic wave energy is radiated in the heating chamber 111, thereby increasing the heating rate.

Figure 8:
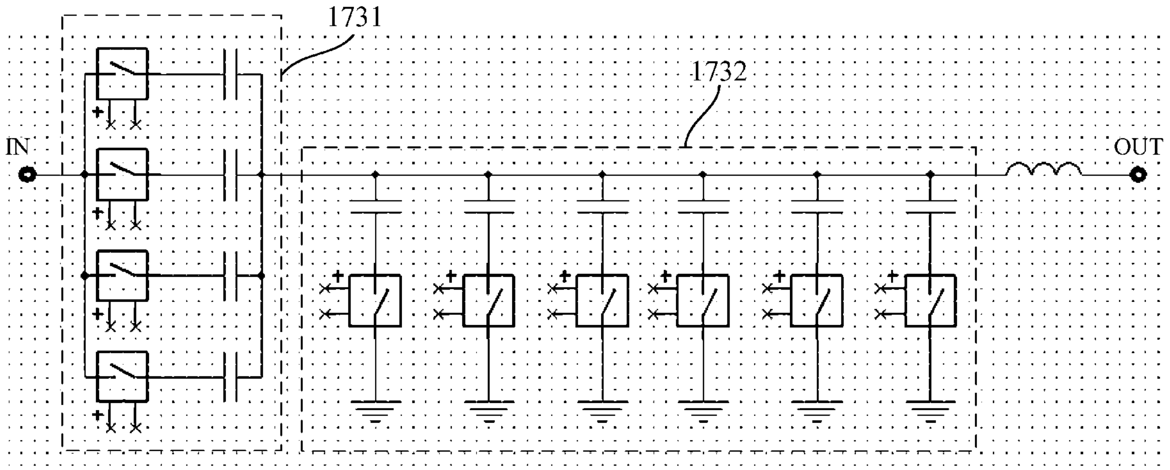
FIG. 8 is a circuit diagram of a matching unit according to one embodiment of the present invention.

FIG. 8 is a circuit diagram of a matching unit according to one embodiment of the present invention, wherein OUT refers to the output end of the matching unit, and IN refers to the input end of the matching unit. Referring to FIG. 8, the matching unit 173 may include a matching module 1731, a matching module 1732 and a fixed value inductor. The matching module 1731 may include a plurality of parallel branches, and the input ends of the plurality of branches may be configured to be electrically connected with the electromagnetic generating module 161. The fixed value inductor may be connected in series between the output end of the matching module 1731 and the radiating antenna 150. The matching module 1732 may also include a plurality of parallel branches; the input ends of the plurality of branches may be connected in series between the matching module 1731 and the fixed value inductor, and the output ends of the plurality of branches may be configured to be grounded.

In the electromagnetic wave generating system of the present invention, since two matching modules which respectively include a plurality of parallel branches are connected in series between the electromagnetic generating module and the radiating assembly, and one end of the matching module far away from the output end of the electromagnetic generating module is grounded, a load combination that is several times the sum of the number of the parallel branches of the two matching modules can be realized. Compared with the technical solution of adjusting the spacing between a radiating unit and a receiving pole by a mechanical electric motor structure in the prior art, the present invention is not only lower in cost, but also higher in reliability and faster in response speed. Compared with the technical solution of adjusting the load impedance by variable capacitors and variable inductors in the prior art, the present invention is not only lower in cost, but also higher in reliability and wider in adjusting range.

In some embodiments, each parallel branch of the matching module 1731 may include a fixed value capacitor and a switch connected in series. Each parallel branch of the matching module 1732 may include a fixed value capacitor and a switch connected in series.

The plurality of switches of the matching module 1731 and the matching module 1732 may be respectively or together integrated into an array type switch assembly to facilitate the on-off control of the switches.

In some embodiments, each parallel branch of the matching module 1732 may also include a fixed value capacitor having one end connected in series between the output end of the matching module 1731 and the radiating antenna 150, and the other end electrically connected with the input end of the capacitor of this branch, so as to improve the matching accuracy of the matching unit 173 and reduce errors.

In some embodiments, the heating device 100 may be used for thawing. The control unit 172 may also be configured to calculate an imaginary part change rate of a dielectric coefficient of the object to be processed according to the power of incident waves and reflected waves, compare the imaginary part change rate with a preset change threshold, and send a stop command to the electromagnetic generating module 161 when the imaginary part change rate of the dielectric coefficient of the object to be processed is greater than or equal to the preset change threshold, so that the electromagnetic generating module 161 stops working, and the thawing program is terminated.

The preset change threshold may be obtained by testing the imaginary part change rate of the dielectric coefficient of foods with different fixed attributes at −3° C. to 0° C., so that the foods have good shear strength. For example, when the object to be processed is raw beef, the preset change threshold may be set to be 2.

The control unit 172 may also be configured to receive a trigger command for starting or stopping the thawing program, and send a corresponding control signal to the electromagnetic generating module 161 according to the trigger command, so that the electromagnetic generating module 161 starts or stops working. The control unit 172 is configured to be electrically connected with the power supply module 162 to obtain electric energy from the power supply module 162 and always in a standby state.

In some embodiments, the signal processing and measurement and control circuit may be integrated on a circuit board 170 to facilitate the installation and maintenance of the signal processing and measurement and control circuit.

The signal processing and measurement and control circuit may be disposed at the rear lower part in the cylinder body 110, which not only can make the cylinder body 110 have a relatively large storage space, but also can avoid the damage to the circuit due to excessively high food placed in the drawer 140. The rear part of the bottom wall of the drawer 140 may be configured to be recessed upward to form an enlarged space below the drawer.

Figure 4:
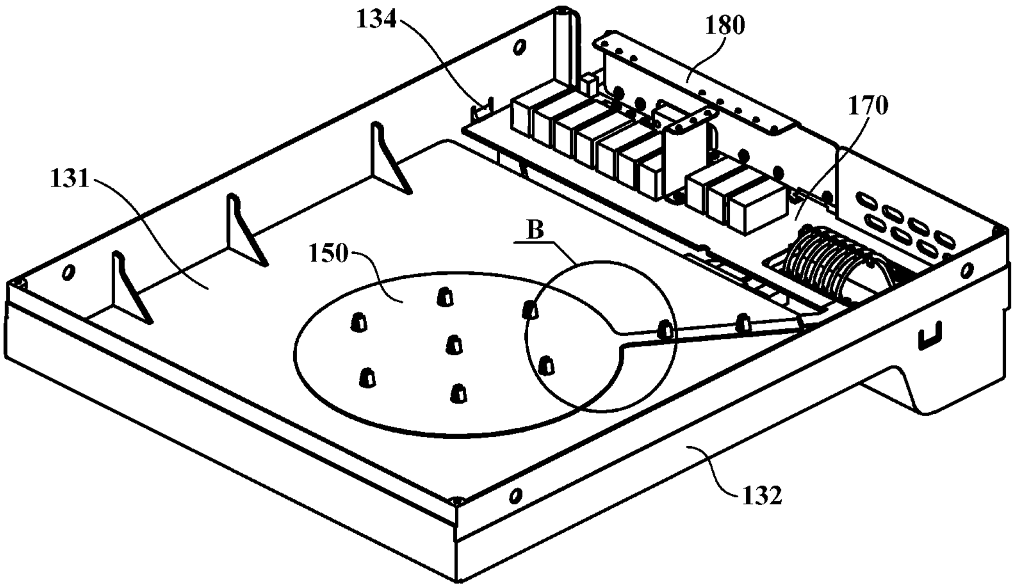
FIG. 4 is a schematic structural view of an electrical appliance chamber according to one embodiment of the present invention.

FIG. 4 is a schematic structural view of an electrical appliance chamber 112 according to one embodiment of the present invention. Referring to FIG. 2 and FIG. 4, the heating device 100 may further include a housing 130 to separate the inner space of the cylinder body 110 into a heating chamber 111 and an electrical appliance chamber 112. The object to be processed and the circuit board 170 may be respectively disposed in the heating chamber 111 and the electrical appliance chamber 112 to separate the object to be processed from the circuit board 170, so as to prevent the circuit board 170 from being damaged by accidental touch.

Specifically, the housing 130 may include a clapboard 131 for separating the heating chamber 111 and the electrical appliance chamber 112, and a skirt part 132 fixedly connected with the inner wall of the cylinder body 110.

In some embodiments, the circuit board 170 may be horizontally disposed. A clamping tongue 134 extending upward and inward may be respectively formed on two lateral side walls of the housing 130, and the circuit board 170 may be clamped above the two clamping tongues 134.

The housing 130 and the cylinder body 110 may be provided with heat dissipation holes 190 respectively in positions corresponding to the matching unit 173, so that the heat generated by the matching unit 173 during working is discharged through the heat dissipation holes 190.

In some embodiments, the radiating antenna 150 may be disposed in the electrical appliance chamber 112 to prevent the radiating antenna 150 from being dirty or damaged by accidental touch.

The housing 130 may be made of an insulating material, so that the electromagnetic waves generated by the radiating antenna 150 can pass through the housing 130 to heat the object to be processed. Further, the housing 130 may be made of a non-transparent material to reduce the electromagnetic loss of the electromagnetic waves at the housing 130, thereby increasing the heating rate of the object to be processed. The above-mentioned non-transparent material is a translucent material or an opaque material. The non-transparent material may be a PP material, a PC material or an ABS material, etc.

The housing 130 may also be configured to fix the radiating antenna 150 to simplify the assembly process of the heating device 100 and facilitate the positioning and installation of the radiating antenna 150, wherein the radiating antenna 150 may be configured to be fixedly connected with the clapboard 131.

Figure 5:
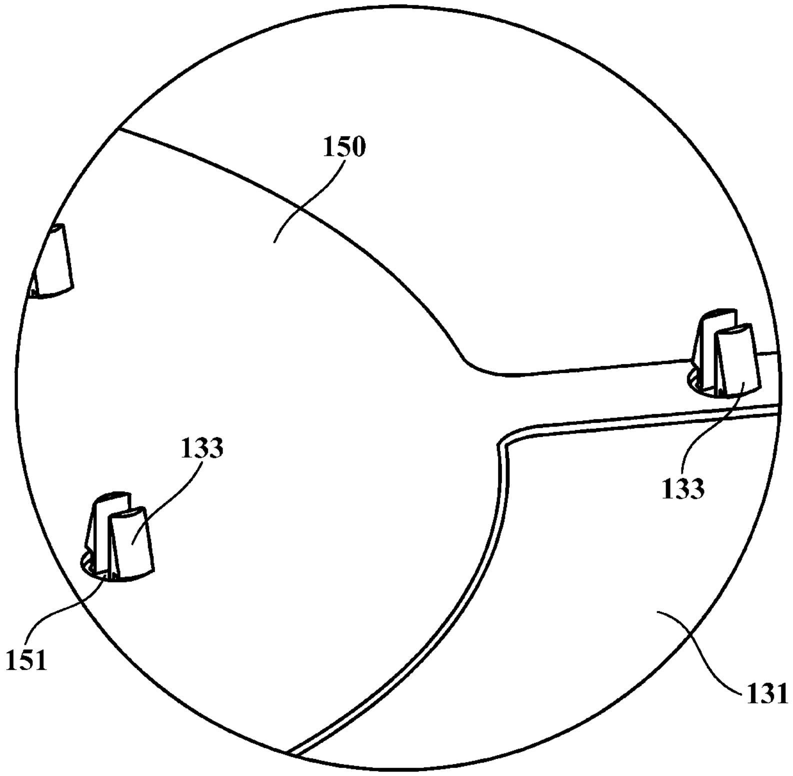
FIG. 5 is a schematic enlarged view of a region B in FIG. 4.

In some embodiments, the radiating antenna 150 may be configured to be fixedly engaged with the housing 130. FIG. 5 is a schematic enlarged view of a region B in FIG. 4. Referring to FIG. 5, the radiating antenna 150 may be provided with a plurality of engaging holes 151; the housing 130 may be correspondingly provided with a plurality of buckles 133, and the plurality of buckles 133 are configured to respectively pass through the plurality of engaging holes 151 to be engaged with the radiating antenna 150.

In one embodiment of the present invention, each of the buckles 133 may be composed of two baths disposed at an interval and in mirror symmetry.

Figure 6:
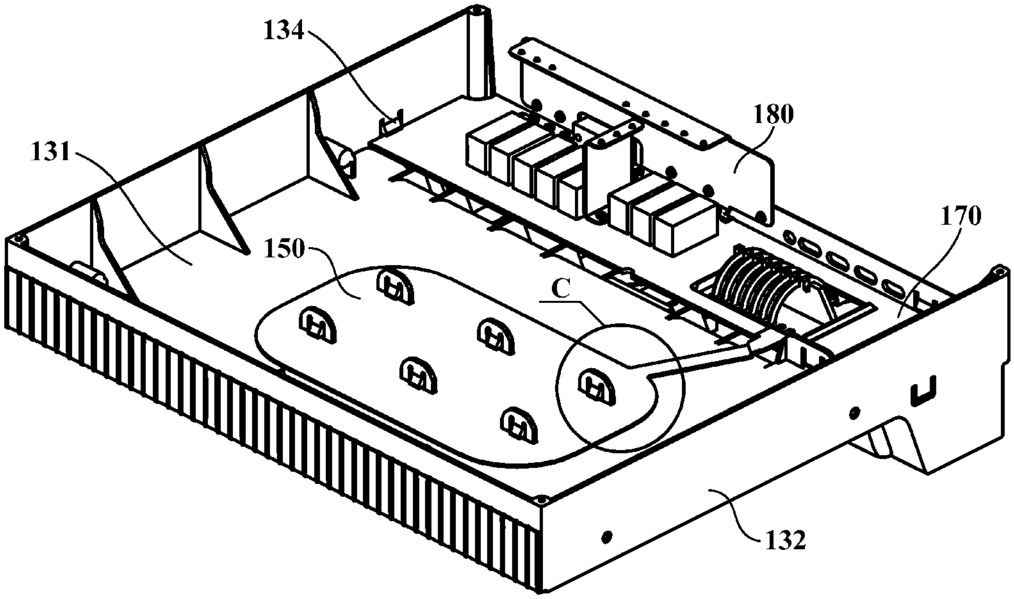
FIG. 6 is a schematic structural view of an electrical appliance chamber according to another embodiment of the present invention.
Figure 7:
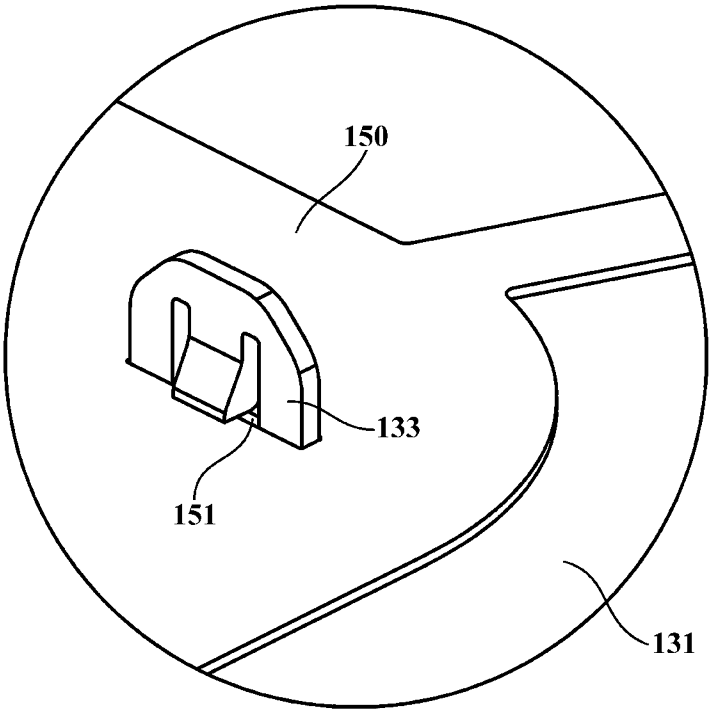
FIG. 7 is a schematic enlarged view of a region C in FIG. 6.

FIG. 6 is a schematic structural view of an electrical appliance chamber 112 according to another embodiment of the present invention. FIG. 7 is a schematic enlarged view of a region C in FIG. 6. Referring to FIG. 6 and FIG. 7, in another embodiment of the present invention, each of the buckles 133 may be composed of a fixing part perpendicular to the radiating antenna 150 and having a hollow middle part, and an elastic part extending inclining to the fixing part from the inner end edge of the fixing part and toward the antenna.

In some other embodiments, the radiating antenna 150 may be configured to be fixed to the housing 130 by an electroplating process.

The housing 130 may further include a plurality of reinforcing ribs, and the reinforcing ribs are configured to connect the clapboard 131 and the skirt part 132 so as to improve the structural strength of the housing 130.

In some embodiments, the radiating antenna 150 may be horizontally disposed at the height of ⅓ to ½, such as ⅓, ⅖ or ½, of the cylinder body 110, so that the volume of the heating chamber 111 is relatively large, and meanwhile, the electromagnetic waves in the heating chamber 111 have a relatively high energy density so as to make the object to be processed heated quickly.

Referring to FIG. 4 and FIG. 6, the peripheral edge of the radiating antenna 150 may be formed by smooth curves, so as to make the distribution of electromagnetic waves in the cylinder body 110 more uniform, thereby improving the temperature uniformity of the object to be processed, wherein a smooth curve refers to a curve of which the first derivative of the curve equation is continuous, which means that the peripheral edge of the radiating antenna 150 has no sharp corner in engineering.

In some embodiments, the metal cylinder body 110 may be configured to be grounded to discharge the electric charges thereon, thereby improving the safety of the heating device 100.

The heating device 100 may further include a metal bracket 180. The metal bracket 180 may be configured to connect the circuit board 170 and the cylinder body 110 to support the circuit board 170 and discharge the electric charges on the circuit board 170 through the cylinder body 110. In some embodiments, the metal bracket 180 may be composed of two parts perpendicular to each other. The metal bracket 180 may be fixedly connected with the housing 130 to facilitate the connection of the housing 130 and the metal bracket 180 with the cylinder body 110.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from the contents disclosed in the present invention. Therefore, the scope of the present invention should be understood and deemed to cover all these other variations or modifications.

The invention claimed is:

1. An electromagnetic wave generating system, comprising:

an electromagnetic generating module, configured to generate an electromagnetic wave signal;

a radiating assembly, comprising one or more radiating units and configured to be electrically connected with the electromagnetic generating module to generate electromagnetic waves of a corresponding frequency according to the electromagnetic wave signal; and a matching unit, connected in series between the electromagnetic generating module and the radiating assembly, and configured to adjust a load impedance of the electromagnetic generating module, wherein the matching unit comprises:

a first matching module, an input end of which is configured to be electrically connected with the electromagnetic generating module;

a fixed value inductor, connected in series between an output end of the first matching module and the radiating assembly; and a second matching module, an input end of which is connected in series between the output end of the first matching module and the inductor, and an output end of which is configured to be grounded, wherein the first matching module and the second matching module respectively comprise a plurality of parallel branches.

2. The electromagnetic wave generating system according to claim 1, wherein each parallel branch of the first matching module comprises a fixed value capacitor and a switch connected in series.

3. The electromagnetic wave generating system according to claim 2, wherein a plurality of switches of the first matching module are integrated into an array type switch assembly.

4. The electromagnetic wave generating system according to claim 1, wherein each parallel branch of the second matching module comprises a fixed value capacitor and a switch connected in series.

5. The electromagnetic wave generating system according to claim 4, wherein a plurality of switches of the second matching module are integrated into an array type switch assembly.

6. The electromagnetic wave generating system according to claim 1, further comprising:

a detection unit, connected in series between the matching unit and the electromagnetic generating module, and configured to detect specific parameters of an incident wave signal and a reflected wave signal passing through the detection unit; and a control unit, configured to calculate an electromagnetic wave absorption rate according to the specific parameters, and send an adjusting command to the matching unit according to the electromagnetic wave absorption rate.

7. A heating device, comprising:

a cylinder body, provided with a pick-and-place opening;

a door body, disposed at the pick-and-place opening and configured to open and close the pick-and-place opening; and an electromagnetic wave generating system according to claim 1, at least a part of which is disposed in the cylinder body or accessed into the cylinder body, so as to generate electromagnetic waves in the cylinder body to heat an object to be processed.

8. The heating device according to claim 7, wherein the matching unit is disposed in the cylinder body; and the heating device further comprises:

a housing, configured to separate an inner space of the cylinder body into a heating chamber and an electrical appliance chamber, wherein the object to be processed and the matching unit are respectively disposed in the heating chamber and the electrical appliance chamber.

9. The heating device according to claim 8, wherein the cylinder body and the housing are provided with heat dissipation holes in positions corresponding to the matching unit.

10. The heating device according to claim 8, wherein:

the electromagnetic wave generating system further comprises:

a detection unit, connected in series between the matching unit and the electromagnetic generating module, and configured to detect specific parameters of an incident wave signal and a reflected wave signal passing through the detection unit; and a control unit, configured to calculate an electromagnetic wave absorption rate according to the specific parameters, and send an adjusting command to the matching unit according to the electromagnetic wave absorption rate, the detection unit, the control unit and the matching unit are integrated on a circuit board; and the cylinder body is made of a metal and is configured to be grounded, and the circuit board is configured to be conductively connected with the cylinder body.

* * * * *